United States Patent [19]

Noel et al.

[11] Patent Number: 4,753,841
[45] Date of Patent: Jun. 28, 1988

[54] AIR-BORNE AND FOOTSTEP NOISE INSULATING PANELS OF SYNTHETIC RESIN FOAM FOR FLOATING PLASTER FLOORS OR FLOATING WOODEN FLOORS

[75] Inventors: Gert Noel, Hauset, Belgium; Jean-Paul Strasser, Fürth-Weschnitz, Fed. Rep. of Germany

[73] Assignee: Noel, Marquet & Cie. S.A., Fed. Rep. of Germany

[21] Appl. No.: 929,411

[22] Filed: Nov. 12, 1986

[30] Foreign Application Priority Data

Nov. 19, 1985 [DE] Fed. Rep. of Germany ....... 3541052
Jul. 4, 1986 [DE] Fed. Rep. of Germany ....... 3622581

[51] Int. Cl.$^4$ .......................... E04C 1/08; E04C 2/44; B32B 3/20
[52] U.S. Cl. .................................... 428/174; 428/178; 428/179; 428/182; 428/184; 428/188; 428/189; 428/316.6
[58] Field of Search ................... 264/45.5, 46.1, 46.3, 264/512, 514, 515; 428/71, 76, 116, 36, 179, 188, 304.4, 166, 174, 178, 182, 184, 185, 186, 189, 316.6; 52/309.4, 309.8, 309.9

[56] References Cited

U.S. PATENT DOCUMENTS

| | | | |
|---|---|---|---|
| 2,369,006 | 2/1945 | Banks | 428/116 |
| 2,994,327 | 8/1961 | Otto et al. | 428/319.9 |
| 3,297,189 | 1/1967 | Carrasse | 428/116 |
| 3,890,416 | 6/1975 | Bauer et al. | 264/46.1 |
| 4,435,463 | 3/1984 | Roellchen | 428/188 |
| 4,618,517 | 10/1986 | Simko, Jr. | 428/188 |

FOREIGN PATENT DOCUMENTS

| | | | |
|---|---|---|---|
| 57-58291 | 12/1982 | Japan | 264/46.1 |
| 1061702 | 3/1967 | United Kingdom | 428/188 |

*Primary Examiner*—William J. Van Balen
*Attorney, Agent, or Firm*—Larson and Taylor

[57] ABSTRACT

An air-borne and footstep noise insulating panel of synthetic resin foam is provided for floating floor pavements or floating wooden floors, said panel having in the interior thereof a multiplicity of voids extending normal or obliquely from one panel edge to the opposite panel edge. The panel preferably consists of a flexible closed-cell synthetic resin foam having a volume weight of 15 to 25 kg/m$^3$, especially less than 20 kg/m$^3$, having a cell diameter of less than 0.3 mm, and exhibiting good elastic recovery. The insulating panel has a dynamic stiffness, measured according to DIN 52214, of 1 to 13 MN/m$^3$ and also possesses the required properties regarding long-term, burning, and insulating behavior.

20 Claims, 11 Drawing Sheets

AIR-BORNE AND FOOTSTEP NOISE INSULATING PANELS OF SYNTHETIC RESIN FOAM FOR FLOATING PLASTER FLOORS OR FLOATING WOODEN FLOORS

The present invention relates to air-borne and footstep noise insulating panels of synthetic resin foam for floating plaster floors or floating wooden floors.

By footstep noise insulation there is generally understood the resistance of a floor or ceiling to the transmission of footstep sound waves. Footstep noise insulation in case of solid bare floors is invariably insufficient. An improvement of footstep noise insulation of bare floors is achieved by the application of a covering in the form of a floating plaster floor, of a floating wooden floor, or of a soft-resilient floor covering. The floating floors improve air-borne and footstep noise absorption of the bare floor, while the soft-resilient floor coverings only effect footstep noise insulation. A floating floor pavement consists of a floorplate resting on a soft-resilient insulating layer. The sound absorbent materials forming the insulating layer below said floorplate must exhibit only a certain degree of stiffness. The stiffness characterizes the resilience of the insulating layer between floor pavement and bare floor under dynamic i.e. varying, stress. Therefore, it is designated as dynamic stiffness $s'$ expressed in $MN/m^3$ units and is determined for various sound insulating materials according to DIN 52214. The improvement of footstep noise absorption VM measured in decibel (dB) is dependent on the dynamic stiffness. In general, it may be said that the improvement of footstep noise absorption is the greater, the more the level of dynamic stiffness is reduced. For the hitherto known sound insulating panels of mineral wool, glass fiber, coconut fiber, cork crumbs and rubber pellets the dynamic stiffness $s'$ of panel thicknesses after installation between 10 and 13 mm varies between 19 and 81 $MN/m^3$, whereby improvements of the footstep noise insulation, with the use of cement floors, between 15 and 28 dB are attainable. Only with a polystyrene hard foam panel of 12.9 mm thickness pretreated by rolling a dynamic stiffness of 13 $MN/m^3$ is allegedly reached in installed condition, which ought to improve the footstep noise absorption on cement flooring by 29 dB. Better ratings could hitherto not be attained with synthetic resin foam panels.

Therefore, it is the object of the present invention to provide an air-borne and footstep noise absorbent synthetic resin foam panel for floating pavement and floating wooden floors which (a) has a dynamic stiffness according to DIN 52214 of 1 to 13 $MN/m^3$, preferably from 3 to 8 $MN/m^3$, which corresponds to an improvement of the footstep noise level VM of at least 30 dB according to DIN 4109;

(b) exhibits the desired long-term behavior, i.e. 2 years after installation it should not exhibit any loss of VM level greater than 2 dB, compared with the initial value;

(c) in case of fire, meets at least the requirements of B2 or B1, respectively; and which (d) at the same time exhibits good thermal insulation characteristics.

According to the present invention, this object is realized in that the panels have a multiplicity of voids in the interior thereof which extend normal or obliquely from one panel edge to the opposite panel edge, and said panels preferably consist of a flexible, closed-cell synthetic resin foam having a volume weight of 15 to 25 $kg/m^3$, especially less than 20 $kg/m^3$, with a cell diameter of less than 0.3 mm, and with good elastic recovery. As synthetic resin material any synthetic resin may be employed which readily lends itself to foaming and which forms a flexible foam. Polyolefins and copolymers thereof are preferred. The preferred polyolefins include polyethylene and polypropylene, especially the non-crosslinked polyethylenes selected from the group of low-density polyethylenes. Of course, the synthetic resin foam may also consist of polyurethanes, polystyrene, styrene copolymers, polyvinyl chlorides etc.

According to the invention, synthetic resin foam panels are preferably used which can be obtained by adhering and/or welding hollow foam profiles to one another and optionally by profiling the lateral edges thereof. Preferably insulating foam tubes are employed as hollow foam profiles, especially tubes having a volume weight of less than 20 $kg/m^3$. In lieu of the standard foam insulating tubes having round cross section it is self-evident that according to the invention all other imaginable hollow profiles can be used, e.g. tubes of square, rectangular or oval cross sections. Tubes of oval cross section are preferred.

Preferred embodiments of the foam panels used according to the invention are the embodiments described in the subclaims and explained in more detail hereafter with reference to FIGS. 1 to 30.

The foam panels according to the invention are preferably produced by adhering, solution-welding or thermally welding hollow foam profiles to one another. A thermal welding method especially suited for the purposes of the invention is described in the second part of this description. It is further possible to weld the hollow foam profiles produced by extrusion to one another in situ, as will also be briefly described in the second part of this description.

Hereafter the invention will first be explained with reference to the figures, without being limited thereto. All the details apparent from the figures are part of the disclosure of the present invention, even if any given detail is not discussed in the following description. In the figures and in the following explanations the reference numerals have the following meanings:

1, 1a, 1b: round insulating foam tubes
2, 2a, 2b: tube panels, each composed of a series of hollow profiles disposed one beside the other and adhered or welded to one another
3, 4, 7, 8: panel edges along the sides formed by the open tube ends
5, 6, 9, 10: panel edges along the sides formed by the tube walls
11: groove
12: tongue
13, 13a: stepped edge
14: laminated rigid or flexible facing layers of homogeneous or foam material
15: facing layers foamed onto the panel
16: foam interlayer
17: foam tubules or rods as ribs
18: larger tubes as ribs
19: tubes with bead as ribs
20: corrugated foam panel
21: electrically heated heat conductor
22: wedge-shaped spacer means
23: frame of steel tubing

Furthermore, it has proved to be advantageous to provide the corrugated foam panel covered with an upper facing board with a rigid or flexible facing board of homogeneous or foamed material also on the underside.

In general, it is expressly pointed out in this context that all the combinations described in connection with tube panels of round foam tubes and shown in the above discussed figures can be produced also with all other illustrated hollow profiles and all imaginable hollow profiles.

In order to attain still further improved noise absorption it is advantageous to fill the voids in the insulating panels of the invention entirely or partially with glass fiber strands and/or other filling materials. It is also possible to flock-coat more or less densely the walls of the voids resulting from the assembly of the hollow profiles, or of the corrugated foam panels, with long and/or short fibers. However, a similar effect can be achieved by shredding the internal skin of the hollow profiles, or the surface of the corrugated foam panel, during the manufacture, i.e. during foaming or afterwards, in such a way that a fibrous surface is obtained. Furthermore, it is possible to introduce, e.g. to shoot, lead balls, shot, or pellets of other, very heavy materials into the walls of the hollow profiles used in composing the tube panels.

FIGS. 28 to 31 illustrate additional possibilities resulting in further improvement of noise absorption.

Moreover, the edges of the insulating panels from which the voids extend through the panel may be sealed with profile bars made of the same foam material as the panel itself, which is regularly so when the voids of the insulating panels are filled entirely or partially with flowable material. The filling may also consist of foamed polystyrene pellets or other foamed synthetic resin particles. The profile bars maybe a simple strip of foam material, or they may have the shape of a stepped edge, a wedge-shaped edge, or a groove and tongue, respectively. The hollow profiles are preferably welded together by means of the apparatus illustrated by FIGS. 31 to 34.

The hollow profiles, the tube panels, and the profile bars and separate tubes are welded one to the other preferably such that the synthetic resin surfaces to be heated up to melting temperature are guided over a spacer means at a distance around an electrically heated heat conductor serving as heat source in such a way that the synthetic resin surfaces to be welded, together with the spacer means, form a heating channel surrounding the heat source.

The apparatus for carrying out said process consists essentially of a heat source, a spacer means disposed upstream of said source, and a means positioned downstream of the heat source for pressing the superficially molten surfaces together. The heat source preferably consists of an electrically heatable heat conductor, especially in the form of a wire or metal strip. Preferably the wire or the metal strip consist of a chromium-nickel alloy, a chromium-nickel-aluminum alloy, or an iron-chromium-nickel alloy. Of course, also all other metals or metal alloys, or nonmetallic heat conductors, e.g. silicon carbide heat conductors, may be employed which normally are used in resistance heating systems. The temperature to which the heat conductor is heated varies within a wide range, e.g. from 600° to 1200° C., and depends on the material to be welded and the speed at which the synthetic resin surfaces are guided past the heat conductor. At high speeds of travel and/or with high-melting thermoplastic synthetic resins it may be advantageous or necessary to arrange two or more heat conductors in series in the direction of travel of the synthetic resin surfaces to be welded together. In order to avoid sagging of the heat conductors, and thus non-uniform heat radiation, it is preferred according to the invention that the heat conductors, especially when in the form of wires or metal strip, are always held taut, also when hot. The tensioning means which preferably also serves as power supply connector, favorably utilizes the elastic force of a tension or compression spring. According to a preferred embodiment, the power supply can be controlled or regulated by means of a thermocouple provided in the vicinity of the heat conductor.

In order to form a heating channel, and in order to guide the synthetic resin surfaces to be welded together past the heat conductor at a certain distance therefrom and out of direct contact therewith, a spacer means is provided shortly upstream of the heat conductor. Said spacer means preferably is wedge-shaped and is so arranged that the sharp edge of the wedge points at the oncoming material, while the back of the wedge faces the heat conductor. The length of the wedge and of the heat conductor depends on the width of the areas to be welded together. The sharp edge of the wedge is preferably slightly rounded in order not to damage the oncoming material. The wedge back is preferably of convex shape and its longitudinal edges are likewise rounded in order to avoid damage to the material. Of course, the back of the wedge may also be of concave shape; in that case the lateral edges are preferably rounded, too. Since said spacer wedge at the same time serves as a heat shield, it may be suitable to provide the spacer wedge with one or more bores or passages in the longitudinal direction in order to provide a possibility of passing coolant medium through the spacer wedge in case excessive heating of the spacer wedge must be apprehended if it is in operation for extended periods of time.

According to another embodiment of the invention, the spacer means can also be a pair of rolls, and in that case the roll diameter and the roll length must be adapted to the requirements prevailing in practice. Pairs of spacer rolls are preferably used according to the present invention in cases where, for example, relatively thick and wide tube panels 2, 2a, are to be welded together, or in cases where the insulating panels of the invention are to be laminated with corresponding homogeneous or foamed sheets or panels or other facing layers, in order to minimize friction at the spacer means. Also with the use of pairs of spacer rolls running preferably in ball bearings it may be desirable to cool them. In such cases at least one of the two rolls is hollow and is so constructed that coolant medium can be passed therethrough.

Hence, by means of the spacer it is possible to guide the synthetic resin surfaces to be welded together at a distance past the heat source to thereby superficially melt the synthetic resin surfaces. Shortly after having passed by the heat source the molten surfaces are compressed by means of suitable devices, e.g. pressure rolls. After the material has cooled down the welding operation is terminated.

Since the welding apparatuses of the invention can be arranged not only side by side but also one above the other, the foam tubes can be simultaneously welded together side by side and one above the other by such a lattice welding system, so that the panels or blocks composed of the foam tubes are obtained.

Figure 31:
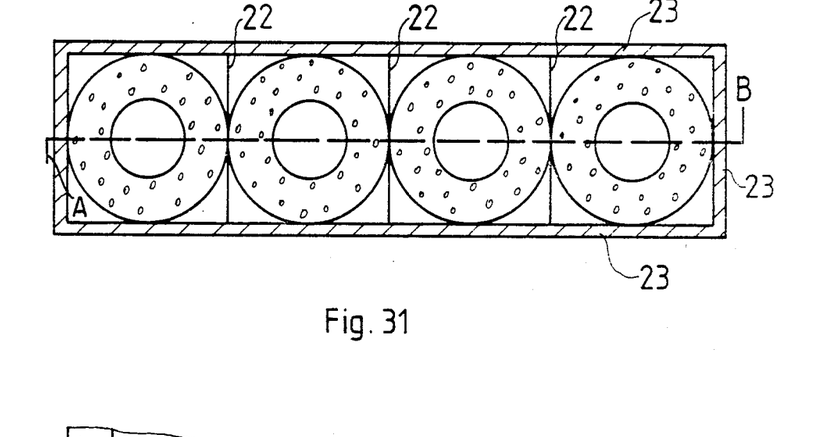
FIG. 31 is a vertical section through a lattice system comprising three welding apparatuses along the line C-D in FIG. 32 for welding foam tubes disposed side by side; in practice said apparatus is so dimensioned—depending on the tube diameter—that ten to twenty tubes can be simultaneously welded together in one plane.
Figure 32:
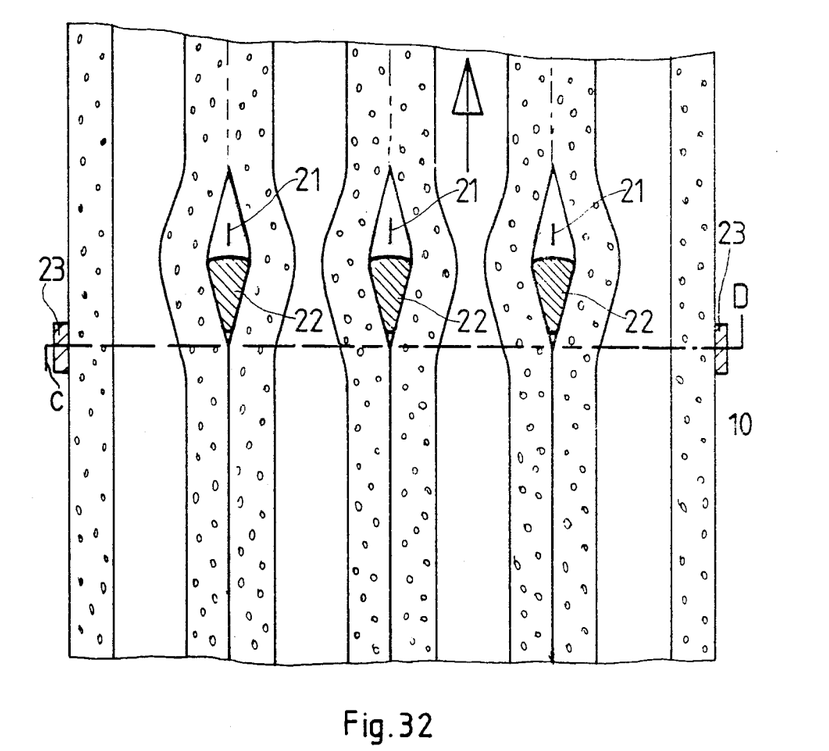
FIG. 32 is a horizontal longitudinal section along the line A-B in FIG. 31.
Figure 33:
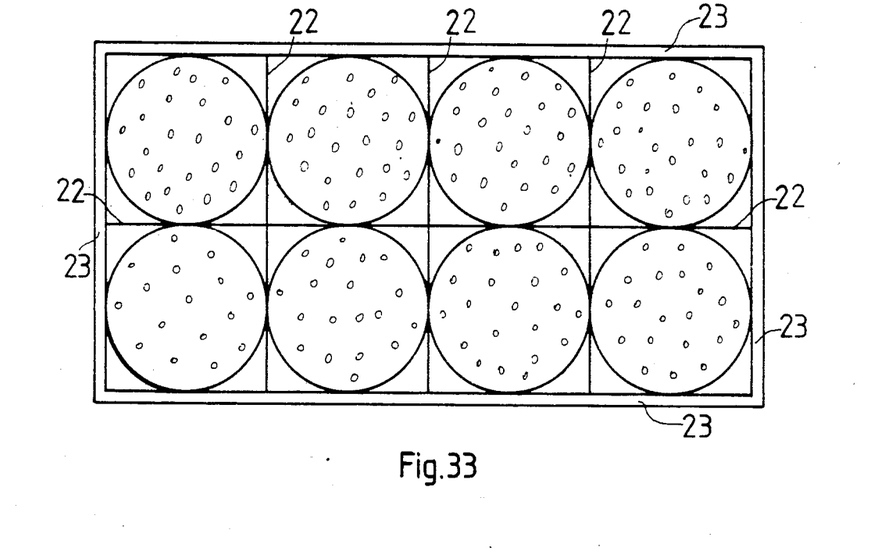
FIG. 33 is a vertical section through a lattice system with one horizontally and three vertically arranged welding apparatuses for simultaneously welding foam tubes together which are disposed side by side and one above the other.
Figure 34:
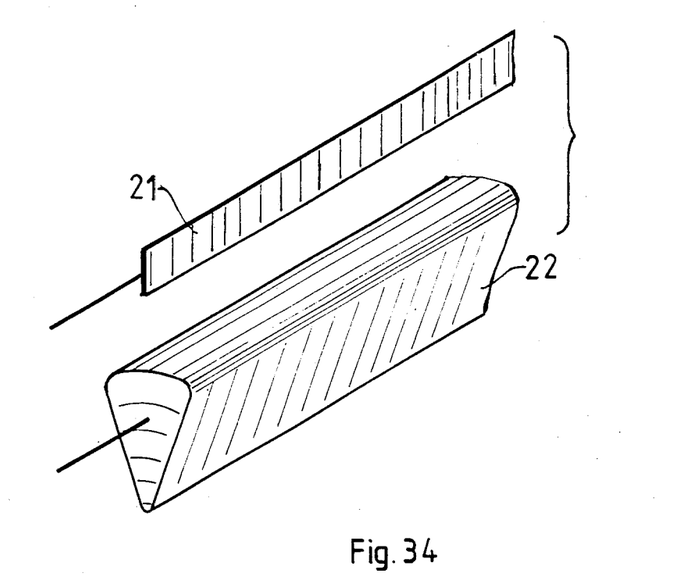
FIG. 34 is a diagrammatic perspective view of the wedge-shaped embodiment of the spacer means and electrically heated heat conductor thereabove in the form of a metal strip.

According to the present invention, the foam tubes are welded together by the mode of operation illustrated by FIGS. 31 to 34. At the frame 23 constructed, for example, from steel tubing (see FIGS. 31 and 33) the wedge-shaped spacer means 22 are arranged vertically (see FIG. 31) and in FIG. 33 also horizontally. In FIGS. 31 and 33 the wedge blades are visible. Centrally downstream of the wedge-shaped spacer means the respective heat conductors 21 are disposed (see FIGS. 32 and 34) which are always held taut (cf. FIGS. 32 and 34) by means of spring tensioning devices, not shown. The spaces between the wedge-shaped spacer means 22 and the lateral frame portions 23—whose distance from one another decreases somewhat in the direction of travel, are preferably so selected that the foam tubes, after having moved past the welding apparatus, are welded together over a large area. In order to exert additional pressure on the superficially molten tube surfaces there is preferably provided shortly downstream of the welding apparatus and across, i.e. normal to the direction of conveyance, a pair of rolls the rolls of which are spaced apart and guide between them the foam tubes.

As shown in FIG. 31, a multiplicity of welding apparatuses can be arranged side by side so that 20 foam tubes, for example, can be easily welded together to one tube panel 2 at the same time. The same applies to the "lattice embodiment" illustrated by FIG. 33 in which a multiplicity of tubes disposed side by side and one above the other can be welded together at the same time. However, for practical reasons it may be advantageous to first weld together simultaneously 10 or 20 foam tubes disposed one beside the other, as shown in FIG. 31, and then to weld the thus obtained tube panels 2, 2a one above the other, as shown in FIG. 33, but without the vertically arranged welding apparatuses.

The insulating panels according to the invention may also be produced by direct extrusion welding. In this continuous process the foamable synthetic resin, preferably polyethylene, is extruded with propellants through suitable nozzles and is allowed to freely foam in the air to form a foam tube. When in this process a multiplicity of nozzles is arranged side by side and/or one above the other, so that the foaming tubes contact each other—which happens already a short distance downstream of the nozzle—and if care is taken that they additionally are pressed one against the other, e.g. by suitably disposed pairs of rolls, the desired insulating panels are obtained "in one step". The welding effect can optionally be promoted by the installation of additional heating means directly downstream of the nozzle orifices in order to remelt, if necessary, any external tube skin that may have grown after foaming. Such heating means may be electrically heated wires or metal strips, or devices issuing hot air.

The following two examples further explain the invention without limiting it, however.

EXAMPLE 1

Flexible polyethylene foam tubes having an internal diameter of 8 mm, an external diameter of 24 mm, and a volume weight of 19 kg/m$^3$ are welded together to form a tube panel 2.

The measurement of the dynamic stiffness according to DIN 52214 reveals the following data:
without covering paper: s'=7 MN/m$^3$
with covering paper: s'=6 MN/m$^3$

EXAMPLE 2

Figure 1:
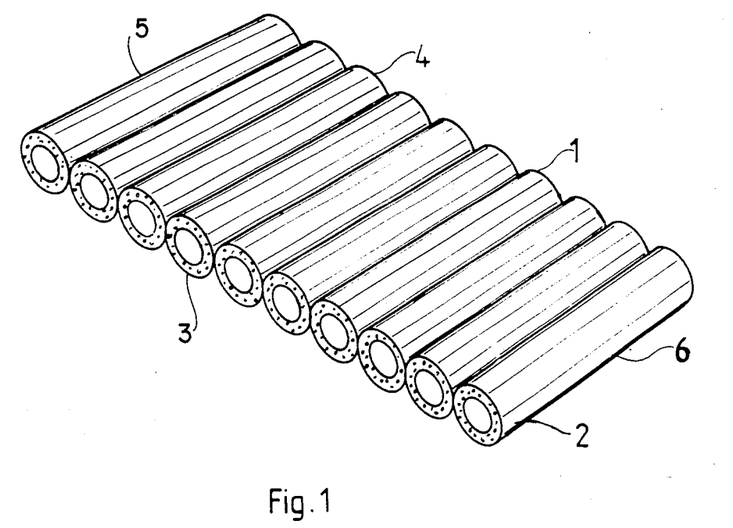
FIG. 1 is a persepctive view of a foam panel, rectangular in plan view, composed of a layer of short foam tubes disposed in parallel side by side and welded together, in which the tube surfaces above and below simultaneously serve as ribs.
Figure 2:
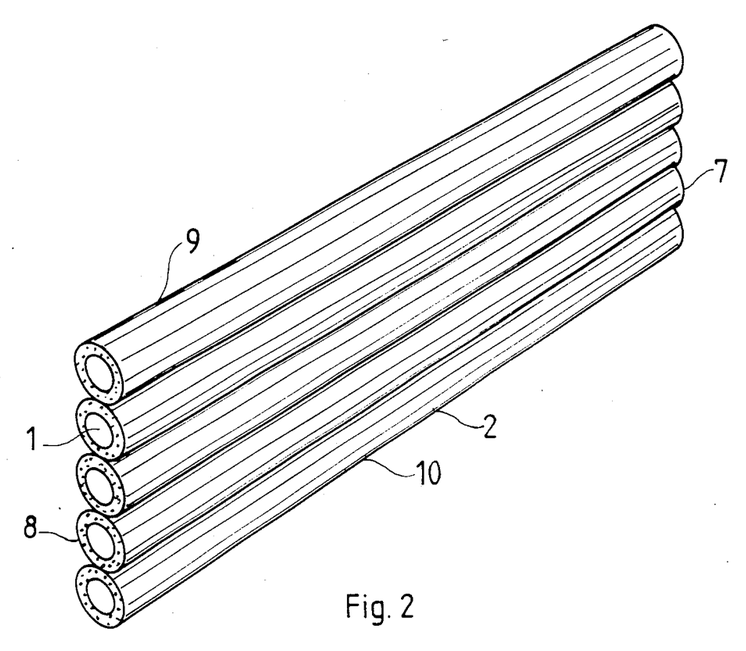
FIG. 2 is a perspective view of a foam panel, rectangular in plan view, composed of a layer of long foam tubes disposed in parallel side by side and welded together.
Figure 3:
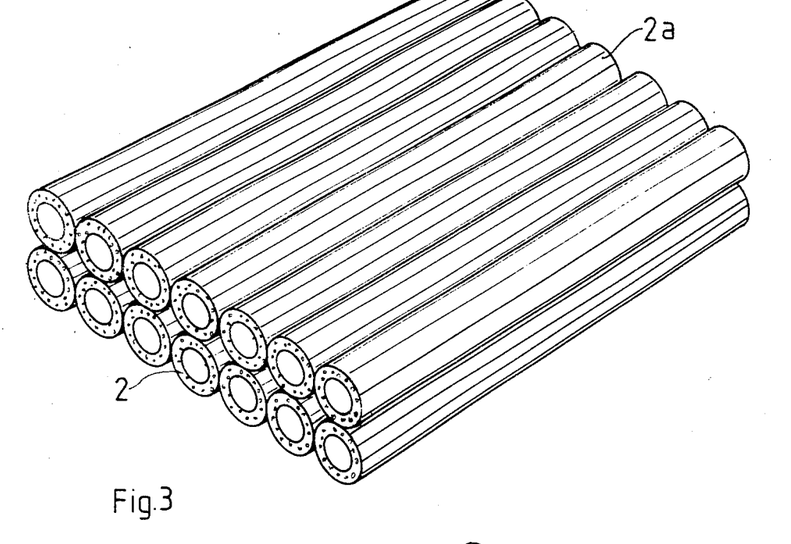
FIG. 3 is a perspective view of a foam panel composed of two superposed layers of short foam tubes disposed in parallel side by side and welded together.
Figure 4:
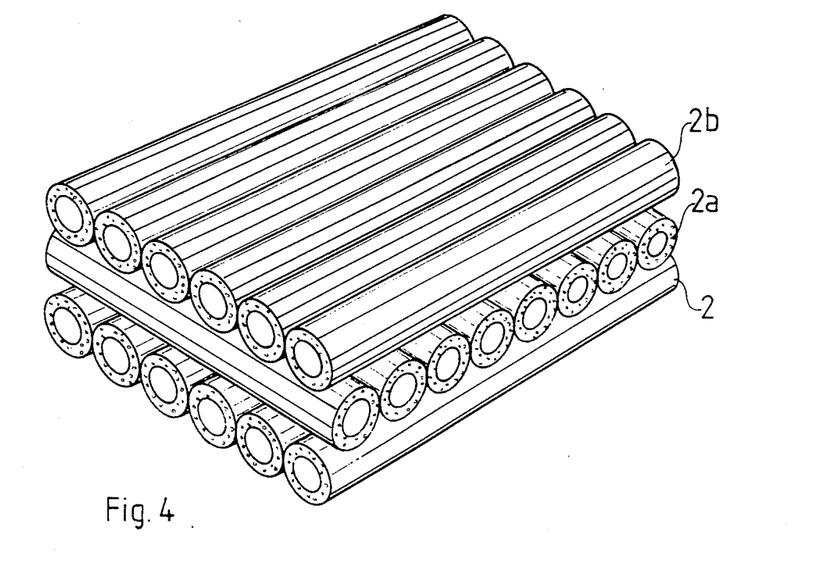
FIG. 4 is a perspective view of three superposed tube panels 2, 2a, 2b in which the upper and lower tube panels 2, 2b correspond to the tube panel of FIG. 1 and the tube panel 2a in the middle is a tube panel corresponding to FIG. 2.
Figure 5:
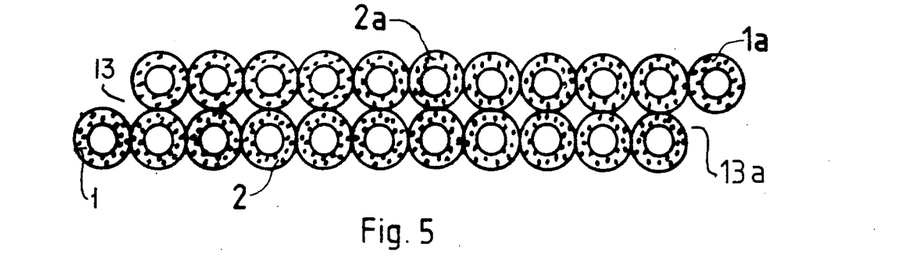
FIG. 5 is a cross section through a foam panel consisting of two superposed tube panels 2, 2a in which by welding an additional tube 1 to the left-hand side below and a tube 1a to the right-hand side above, the conditions for stepped edges 13, 13a have been created.
Figure 6:
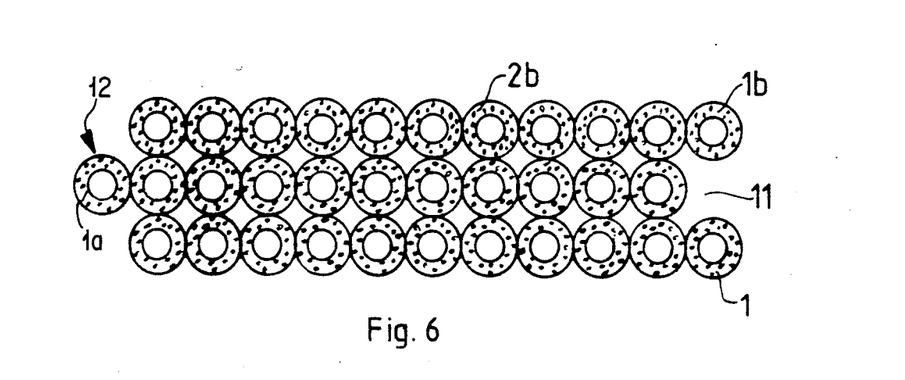
FIG. 6 is a cross section through a foam panel consisting of three superposed tube panels 2, 2a and 2b where by additional welding of tubes 1, 1a, 1b a groove 11 and a tongue 12 are formed.
Figure 7:
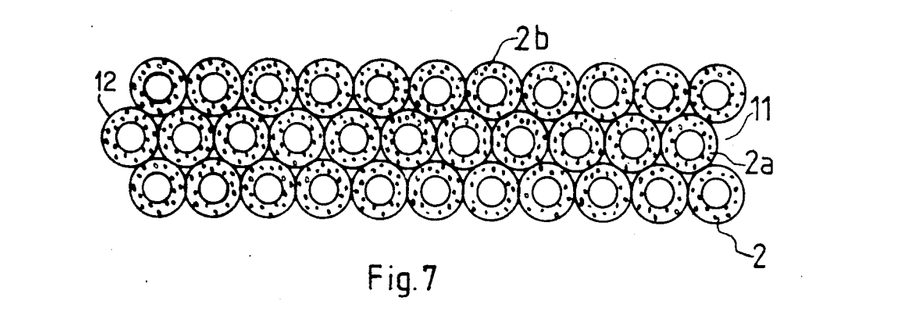
FIG. 7 is a foam panel, as illustrated in FIG. 6, where the central tube panel 2a is so arranged that the longitudinal axes of the associated tubes are each disposed in the vertical plane extending through the weld seams disposed above and below. In this case, too, a groove 11 is formed on one side and a tongue 12 on the other side.
Figure 8:
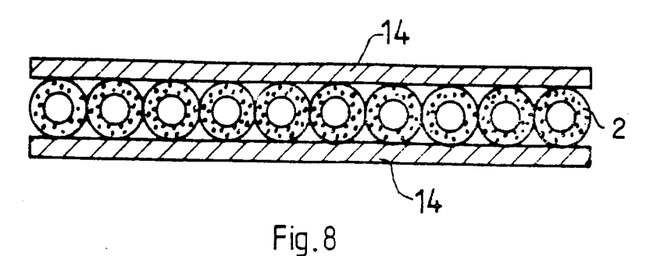
FIG. 8 shows in cross section a foam panel consisting of a tube panel 2 laminated on both sides with a foam layer 14.
Figure 9:
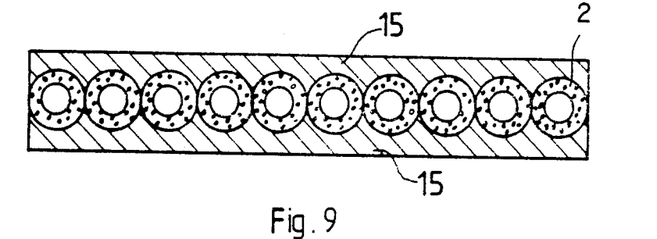
FIG. 9 is a cross section through a foam panel consisting of a tube panel 2 onto which a synthetic resin layer 15 is foamed on both sides.
Figure 10:
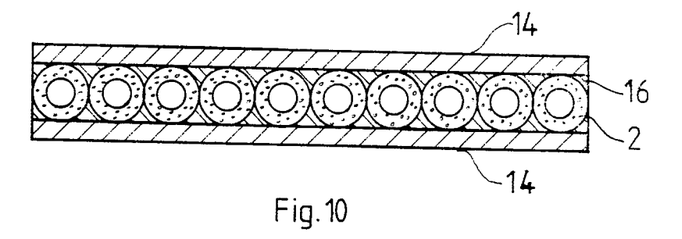
FIG. 10 is a cross section through a foam panel having on both sides a facing layer 14 bonded by way of a foam interlayer 16 to the tube panel 2.
Figure 11:
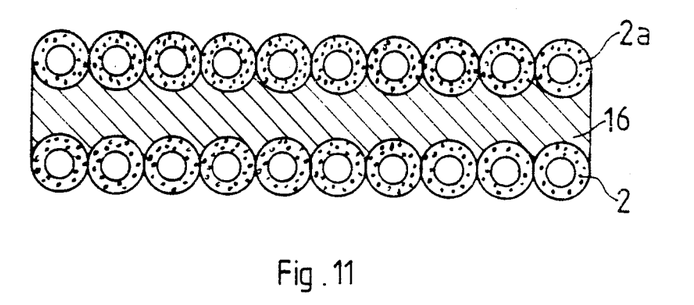
FIG. 11 is a cross section through a foam panel in which two tube panels 2 and 2a are bonded together by way of a foam interlayer 16.
Figure 12:
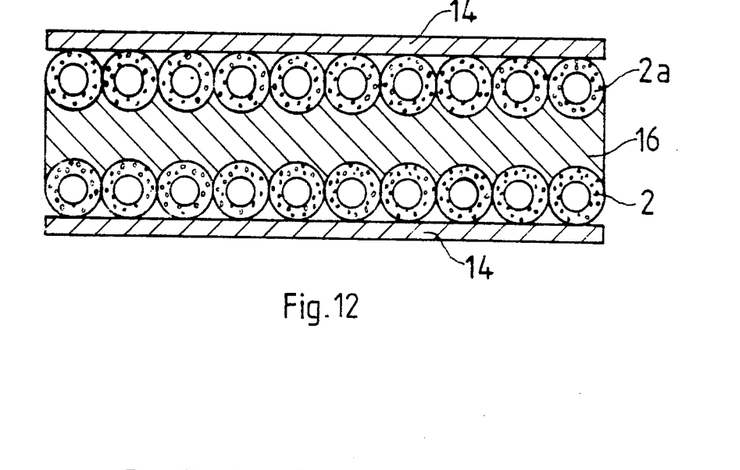
FIG. 12 is a cross section through a foam panel according to FIG. 11 to which a foam layer 14 is laminated on both sides.
Figures 13, 14:
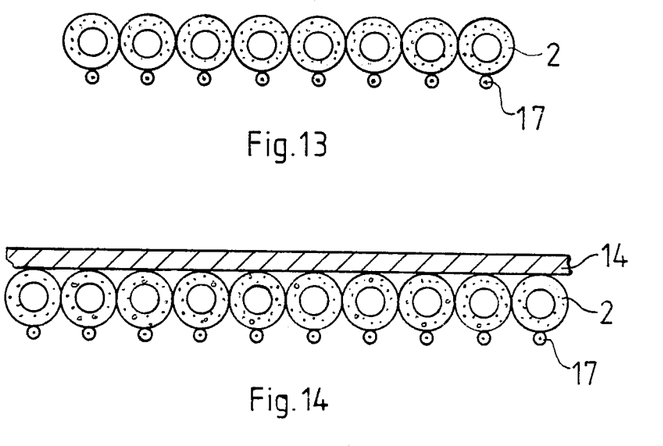
FIG. 13 is a cross section through a foam panel consisting of a tube panel 2 provided on the underside with ribs in the form of round foam rods 17 which may optionally have a wire core.
FIG. 14 shows a foam panel according to FIG. 13 to which an additional facing layer 14 is laminated on top of the tube panel 2.
Figure 15:
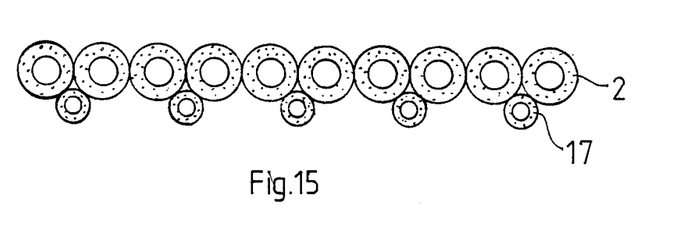
FIG. 15 is a cross section through a foam panel to which smaller foam tubes 17 are welded as ribs. To this panel, too, a facing foam layer 14 may be laminated on top.
Figure 16:
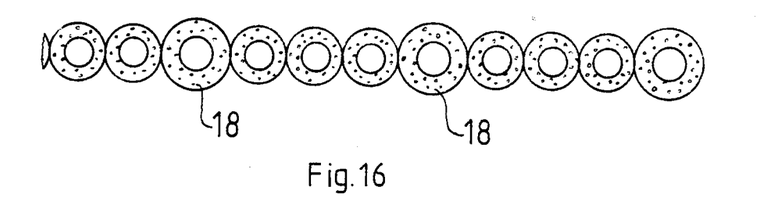
FIG. 16 is a cross section through a foam panel in which the standard tubes are replaced at spaced intervals by larger tubes 18 projecting on one side and in this way performing the function of ribs. This panel, too, can be lamined with a facing foam layer 14 on top. It is advantageous to provide a thicker and a thinner tube in alternating sequence so that the thicker tube may project from the panel plane both in downward and in upward direction.
Figure 17:
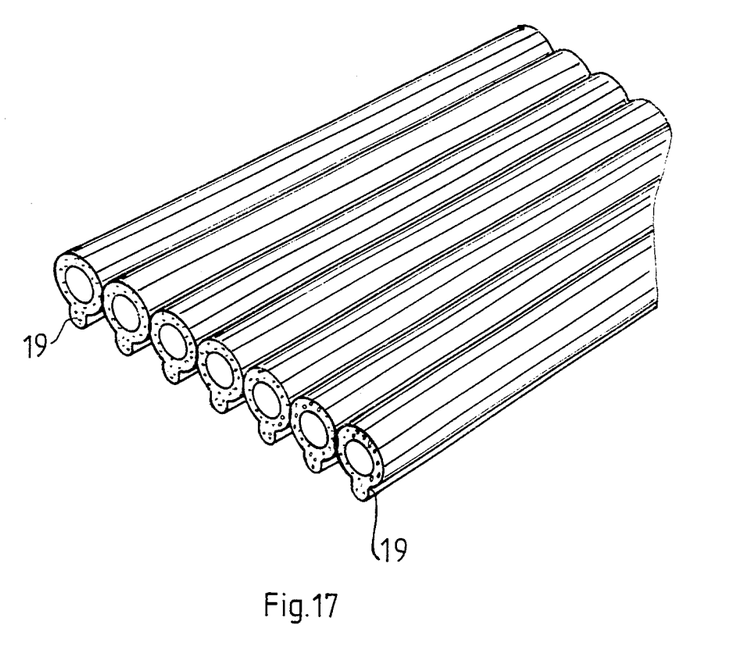
FIG. 17 is a perspective view of a tube panel composed of tubular hollow foam profiles provided with a rib-like projection 19 on the underside. This rib-like projection may be co-extensive or cut away at spaced intervals, which may be longer or relatively short, leaving a stud-like or nipple-like supporting area.
Figure 18:
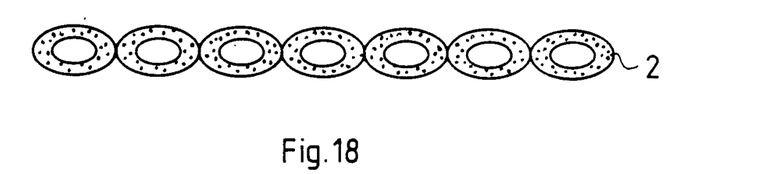
FIG. 18 is a cross section through a tube panel 2 produced from oval insulating foam tubes resting on their longer sides.
Figure 19:
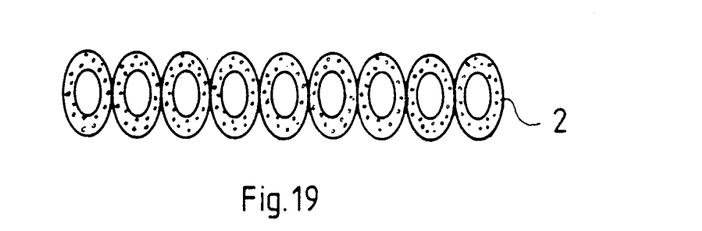
FIG. 19 is a cross section through a tube panel 2 composed of oval insulating foam tubes standing upright, which is especially preferred according to the invention.
Figure 20:
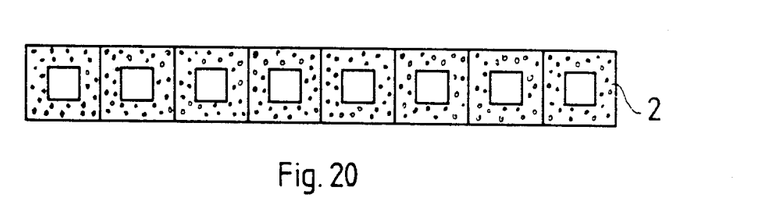
FIG. 20 is a cross section through a tube panel composed of quadrangular tubes bonded together all along their side faces.
Figure 21:
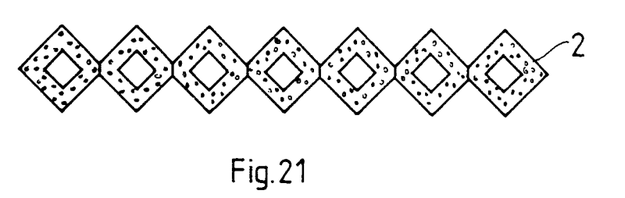
FIG. 21 is a cross section through a tube panel 2 composed of quadrangular tubes bonded together corner-wise.
Figure 22:
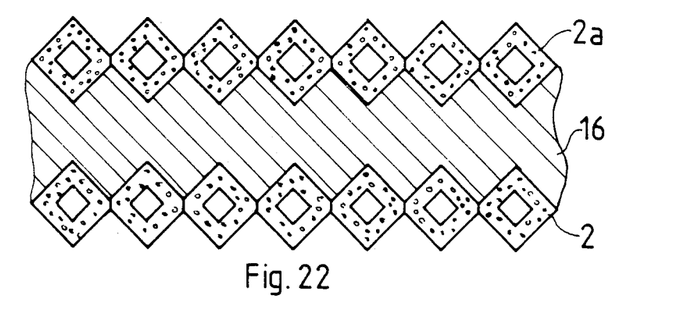
FIG. 22 is a cross section through two tube panels 2, 2a according to FIG. 21 bonded together by way of a foam interlayer 16. The free longitudinal sides of the quadrangular tubes projecting out of the panel perform the rib function.
Figure 23:
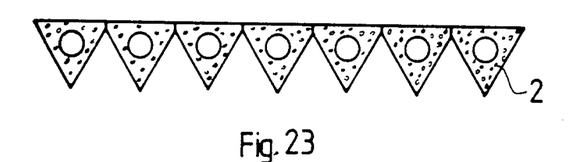
FIG. 23 shows a tube panel 2 produced from triangular tubes. On the upper face of such a tube panel there is advantageously provided an additional rigid or flexible facing board of homogeneous or foamed material.
Figure 24:
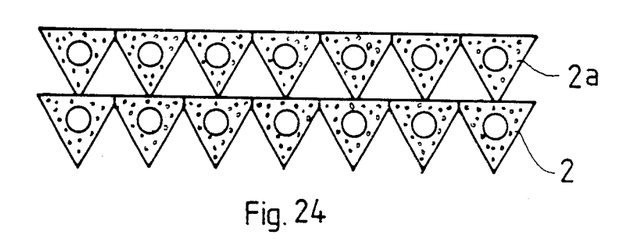
FIG. 24 shows two superposed tube panels 2 according to FIG. 23 bonded together. These two tube panels can advantageously be disposed at right angles, as shown in FIG. 4 with tube panels 2 and 2a of round foam tubes.
Figure 25:
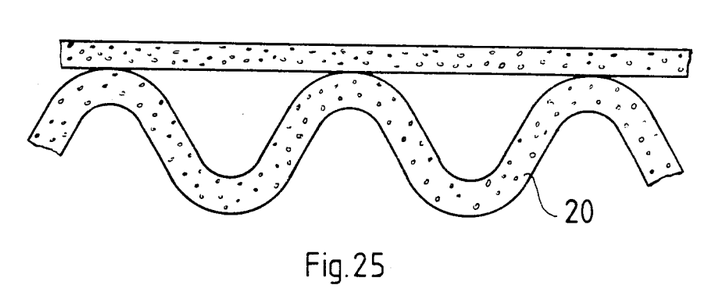
FIG. 25 shows an insulating panel consisting of relatively rigid facing board of homogeneous or foamed material and a corrugated flexible foam panel bonded thereto which may have been extruded in corrugated form or accordingly shaped after extrusion. Of course, a corresponding planar flexible foam panel can be durably bonded to the facing board upset in wave form.
Figure 26:
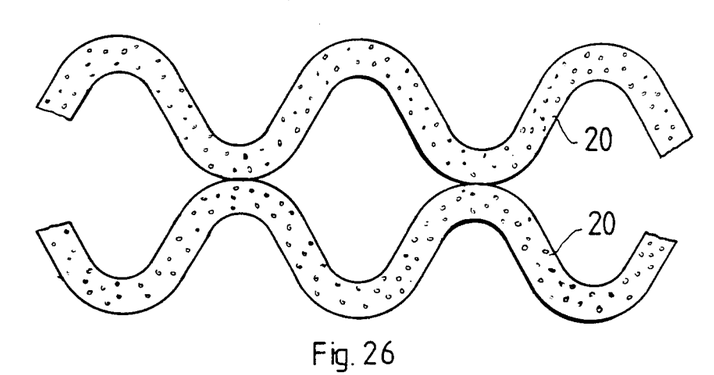
FIG. 26 shows an insulating panel of two flexible corrugated foam panels bonded together in parallel, as described above in connection with FIG. 25. Here, too, it is advantageous to provide the insulating panel with a facing board on top and preferably also on the bottom, like the panel shown in FIG. 25. Moreover, the two corrugated foam panels may be bonded together in the middle by way of a third rigid or flexible board of homogeneous or foamed material.
Figure 27:
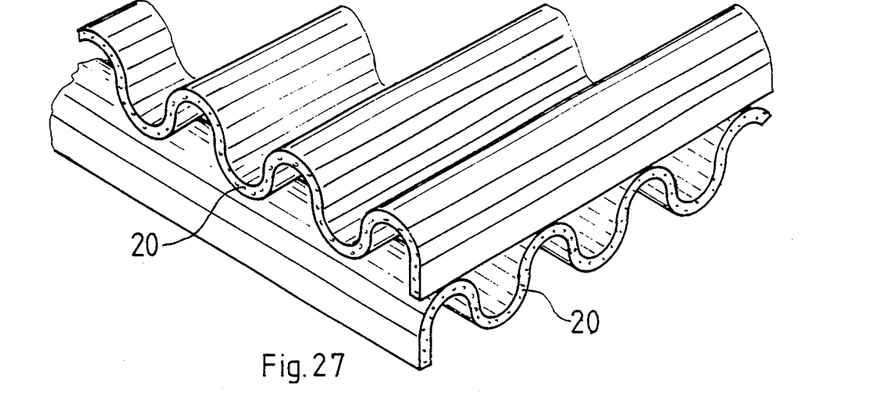
FIG. 27 shows two of the above described corrugated foam panels bonded together crosswise and also provided optionally with upper, lower, and central facing boards, as described above in connection with FIG. 26.
Figure 28:
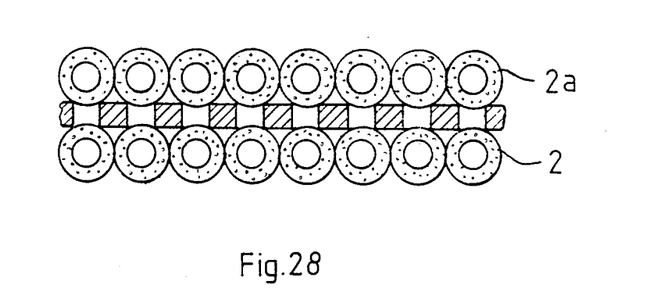
FIG. 28 is a cross section through two tube panels 2, 2a joined one to the other by way of a super-lightweight panel. The voids in the hollow profiles of the super-lightweight panel are so selected that their open ends are closed after they have been bonded to the tube panels 2, 2a. Preferably the voids of the hollow profiles of the super-lightweight panel are partially filled with readily flowing granular material, e.g. with quartz sand. The super-lightweight panels themselves are obtained, for example, by welding many foam tubes to form a block and vertically slicing from said block, normal to the longitudinal axis of the foam tubes, panels having the desired panel thickness.
Figure 29:
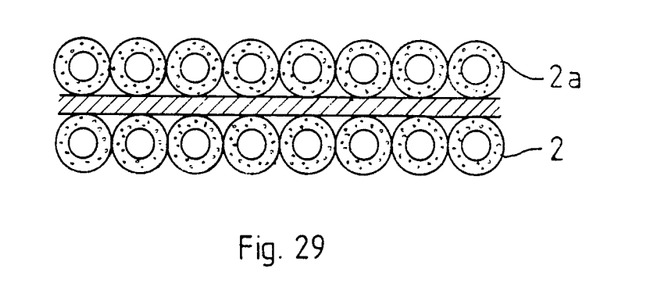
FIG. 29 is a cross section through an insulating panel composed of the tube panels 2, 2a bonded together by way of a homogeneous rigid, semi-rigid, or flexible panel of heavy materials, e.g. lead. It may be advantageous to form such an assembly at the site of construction by first laying the tube panels 2 on the bare floor, then covering them with concrete slabs, and then laying the tube panels 2a on said concrete slabs before casting the plaster floor on top.
Figure 30:
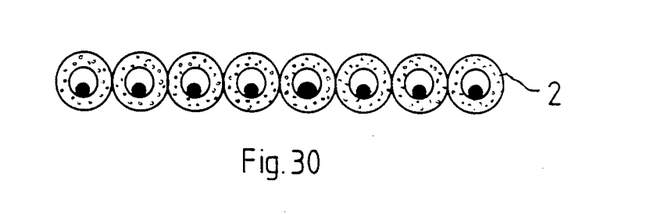
FIG. 30 is a cross section through a tube panel 2 with inserted lead rods or other heavy strand material that may be used, if desired, also for the production of the above described multi-layer insulation panels.

Two tube panels 2 and 2a produced as described in Example 1 are welded together as shown in FIG. 4 so that the longitudinal axes of the tubes of the lower tube panel 2 extend normal to the longitudinal axes of the tubes of the upper tube panel 2a. These tube panels 2, 2a disposed crosswise one above the other exhibit the following dynamic stiffness data measured according to DIN 52214:
without covering paper: s'=3 MN/m$^3$
with covering paper: s'=3 MN/m$^3$

What is claimed is:
1. A floating floor, comprising:
a base surface,
a floorplate forming the upper surface of the floating floor,
and a noise insulation panel between the base surface and the floor plate, said panel made of synthetic resin foam, said foam having a plurality of openings extending generally parallel to each other from one edge of the panel to another edge of the panel.

2. A floating floor according to claim 1, wherein the panel is rectangular and the openings extend from one edge thereof across the panel to an opposite edge thereof.

3. A floating floor according to claim 1, wherein the panel is rectangular and the openings extend obliquely relative to the edges of the panels, extending from one edge thereof to an adjacent edge thereof.

4. A floating floor according to claim 1, wherein the openings are disposed in a plurality of superposed planes.

5. A floating floor according to claim 4, wherein the openings are formed as tubes which are embedded in a synthetic resin layer.

6. A floating floor according to claim 4, wherein the openings extending parallel to each other in one plane are perpendicular to the openings in an adjacent plane.

7. A floating floor according to claim 1, wherein the openings are formed by tubular elements with rounded outer cross sections.

8. A floating floor according to claim 7, wherein the said cross section is circular.

9. A floating floor according to claim 7, wherein said cross section is oval.

10. A floating floor according to claim 1, wherein the openings are formed as tubular elements which are triangular in cross section.

11. A floating floor according to claim 1, wherein the openings are formed by tubular elements which are rectangular in cross section.

12. A floating floor according to claim 1, wherein the openings are sealed at their outer edges.

13. A floating floor according to claim 1, wherein the panel is provided with ribs or studs on the side thereof facing the base surface.

14. A floating floor according to claim 13, including ribs or studs on the side of the panel facing the floorplate.

15. A floating floor according to claim 1, wherein the openings are filled or flocked entirely or partially with fiber strands, random fiber blends or foam pellets.

16. A floating floor according to claim 1, wherein the openings are formed by hollow tubular profiles which are arranged side-by-side and welded together.

17. A floating floor according to claim 1, wherein the synthetic resin foam is flexible and has closed cells, the cell diameter being less than 0.3 mm, the volume weight ranging from 15 to 25 $kg/m^3$, and the panel having relatively good elastic recovery.

18. A floating floor according to claim 1, wherein the synthetic resin foam consists of polyolefins, especially polyethylene, polypropylene, or copolymers thereof with other polymerizable substances.

19. A floating floor according to claim 1, wherein the panel comprises a plurality of layers of openings, the openings in each panel extending parallel to the openings in the adjacent panels, and the openings in each layer being arranged laterally relative to the openings in adjacent panels to form stepped or grooved edges of the panel.

20. A floating floor according to claim 1, the openings being formed between undulations of a corrugated foam panel.

* * * * *